United States Patent
Callaghan

[15] 3,679,180
[45] July 25, 1972

[54] CABLE CONTROL SYSTEM

[72] Inventor: Joseph C. Callaghan, Dollard Des Ormeau, Quebec, Canada

[73] Assignee: Her Majesty the Queen in right of Canada as represented by the Minister of National Defence of Her Majesty's Canadian Government

[22] Filed: Oct. 17, 1969

[21] Appl. No.: 867,322

[52] U.S. Cl.................................254/172, 104/114, 242/75
[51] Int. Cl.................................................B66d 1/48
[58] Field of Search..................254/172, 173; 242/75, 75.1; 104/114

[56] References Cited

UNITED STATES PATENTS

| | | | |
|---|---|---|---|
| 3,489,967 | 1/1970 | Hank | 242/75 |
| 3,309,065 | 3/1967 | Prud'Homme | 254/172 |
| 3,361,080 | 1/1968 | Born | 254/172 |
| 3,507,470 | 4/1970 | Lewis | 254/172 |

FOREIGN PATENTS OR APPLICATIONS

| 1,294,078 | 4/1969 | Germany | 254/172 |
|---|---|---|---|

*Primary Examiner*—Harvey C. Hornsby
*Attorney*—Stevens, Davis, Miller & Mosher

[57] ABSTRACT

This application discloses means for maintaining a desired tension in a cable used to winch a helicopter down to the deck of a ship. In the system described, a cable accumulator is used interposed between the helicopter and a constant tension haul down winch. This cable accumulator stores a variable amount of cable to provide a snatch-absorbing facility. In a control system for the winch, the tension in the cable is sensed and utilized, but in addition two transducers measure the cable velocity respectively on opposite sides of the cable accumulator. The difference between the outputs of the two transducers provides an anticipatory control term.

7 Claims, 5 Drawing Figures

CABLE CONTROL SYSTEM

It has been proposed that a helicopter shall be hauled down onto the deck of a ship at sea by a cable acting against the lift produced by the helicopter rotor. This enables the helicopter to land safely despite pitching of the ship and despite the action of wind on the aircraft. In that proposal a probe carried by the helicopter is seized in a trap carried by the ship so that once the helicopter has landed it is held firmly against movement relative to the ship, and eventually the trap is used to transport the helicopter bodily into a hangar in which the helicopter is stored.

It is important that the tension in the cable used to haul the helicopter down onto the ship shall be fully under the control of a ship-based operator during the haul down, and the present invention is directed to a cable control system which can provide the desired tension control.

According to the present invention, means for maintaining a desired tension in a length of a cable comprise a cable tensioning winch, a reversible driving motor for that winch, control means for the driving motor, tension sensing means arranged to monitor the actual tension in the said length of cable, tension setting means arranged to provide a signal representative of a desired cable tension, a cable accumulator arranged to store a bight or loop of the cable at a point intermediate the winch and the said length of the cable, this accumulator being such that the amount of cable stored in the bight or loop can vary from instant to instant to provide a snatch-absorbing and shock-absorbing facility, a first device providing an output signal indicative of the actual winch speed, a second device acting upon the part of the cable between the accumulator and the said length of cable and providing an output signal indicative of the actual velocity of the said length of cable, and control means arranged to receive the outputs from the first device, the second device, the output from the tension sensing means and the output from the tension setting means and in accordance with these inputs to control the direction and the speed of operation of the driving motor for the winch in a manner producing the desired tension in the said length of cable.

The invention will now be described, by way of example, with reference to the accompanying drawings, in which.

Figure 1:
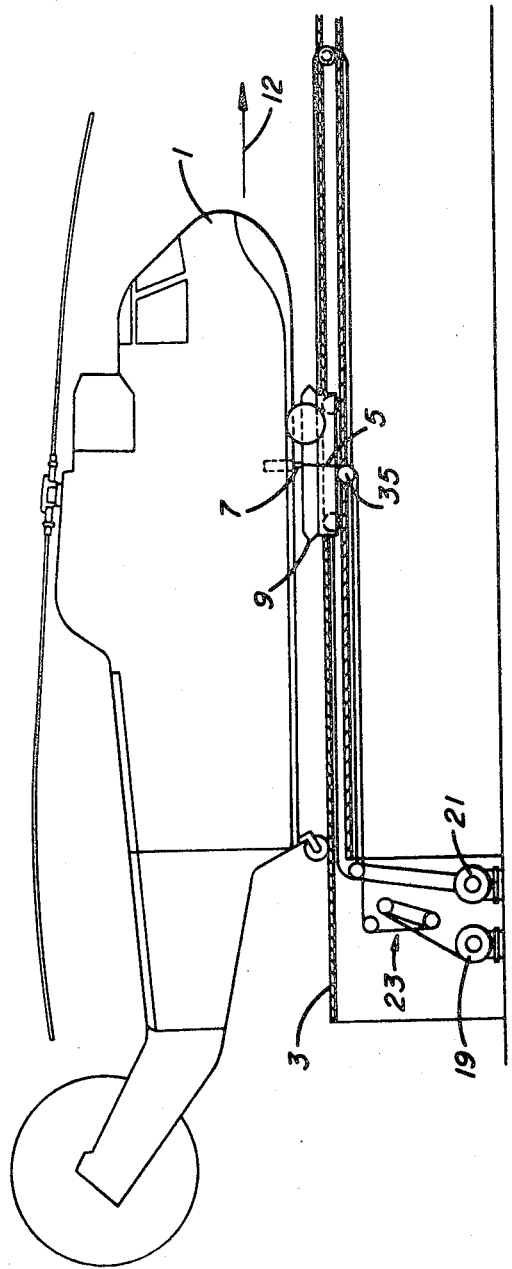
FIG. 1 is a side elevation of a helicopter in the final stages of being winched down onto the deck of a ship.

Referring to the drawings of the present application, Canadian Pat. application No. 914,140 filed Oct. 16, 1964 in the names of William G. Stewart and Asbjörn Baekken discloses a system for hauling down a helicopter 1 down onto the deck 3 of a ship at sea, the helicopter first picking up by messenger line a cable 5 from the ship flight deck 3 and then, after that cable has been secured to the helicopter, an operator on the ship by means of a constant tension winch hauling the helicopter down by the cable 5 against the lift of the helicopter rotor until a probe 7 on the underside of the helicopter is clamped within a trap 9 in the present drawing. The trap can then be moved forwardly of the ship (i.e., in the direction of arrow 12), taking the helicopter with it, into a hangar.

The constant tension winch of the prior proposal is required to fulfil a very exacting task, and the apparatus now to be described carries out that task more effectively than does the constant tension winch of the prior proposal.

Figure 2:
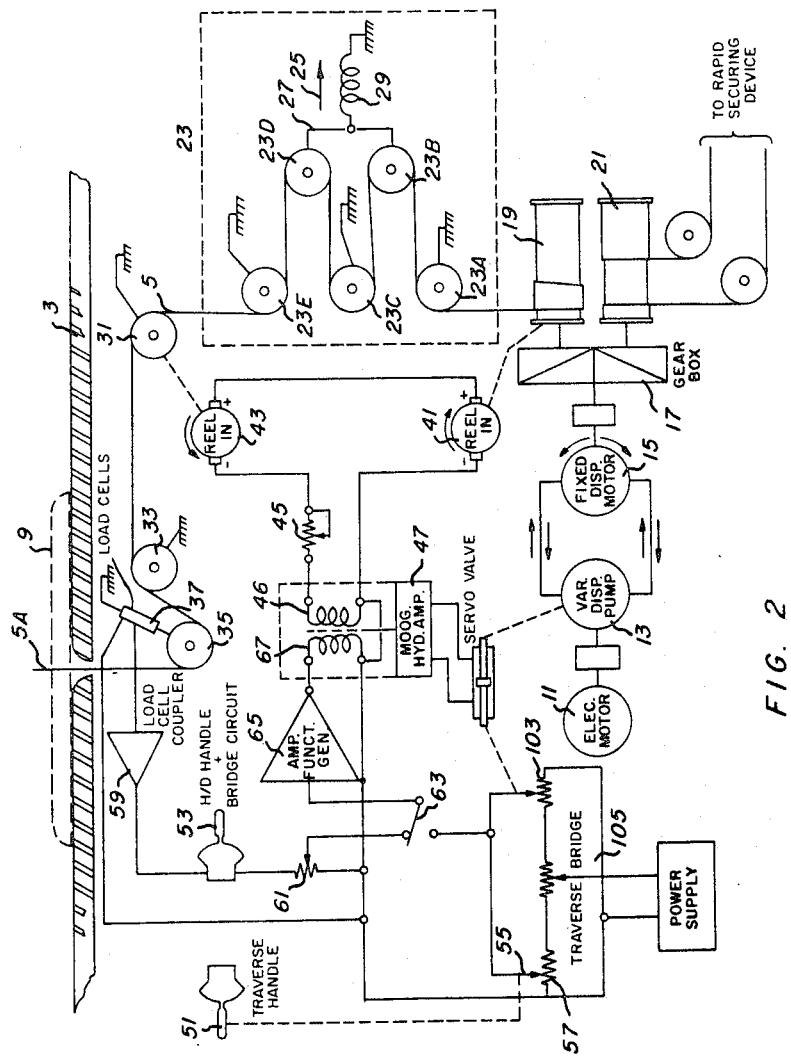
FIG. 2 is a schematic representation of the arrangement of cables and the circuit arrangements of winches operating on those cables in the ship-borne helicopter hoist-down system shown in use in FIG. 1.

In FIG. 2, an electric motor 11 is coupled to the driving shaft of a variable displacement hydraulic pump 13, connected in closed circuit to a fixed displacement hydraulic motor 15. Such an arrangement is well known in the art, and commonly makes use of a pump with a tiltable swash plate or, as in the embodiment described, a pump with a fixed swash plate but an adjustable tilt head. The output shaft of this hydraulic motor is connected through a gearbox 17 alternatively either to a drum 19 of a haul down winch or to a drum 21 of a trap traversing winch. The present invention does not relate to the trap traversing winch, which is used merely for moving the trap 9 into and out of the hangar referred to above.

Figure 4:
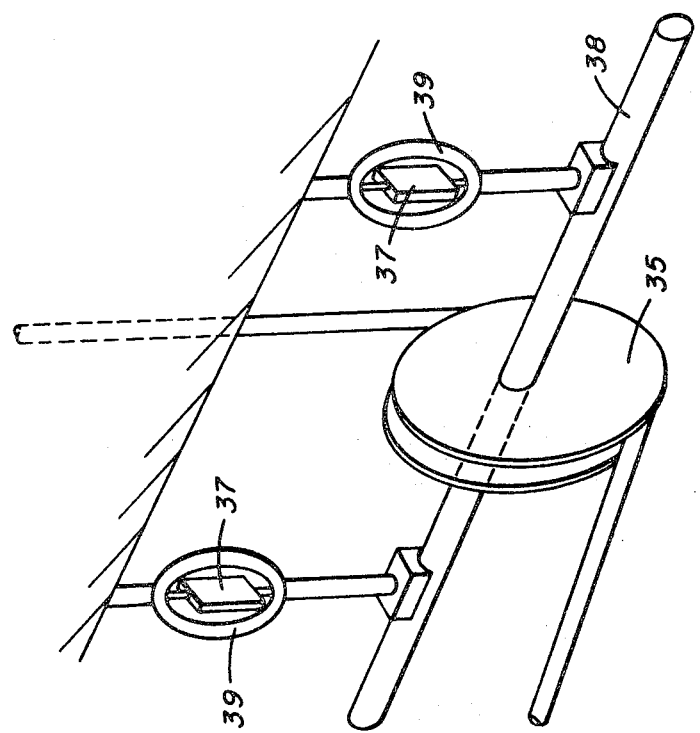
FIG. 4 is a perspective drawing of a sheave and load cell arrangement indicated diagrammatically in FIG. 2.
Figure 5:
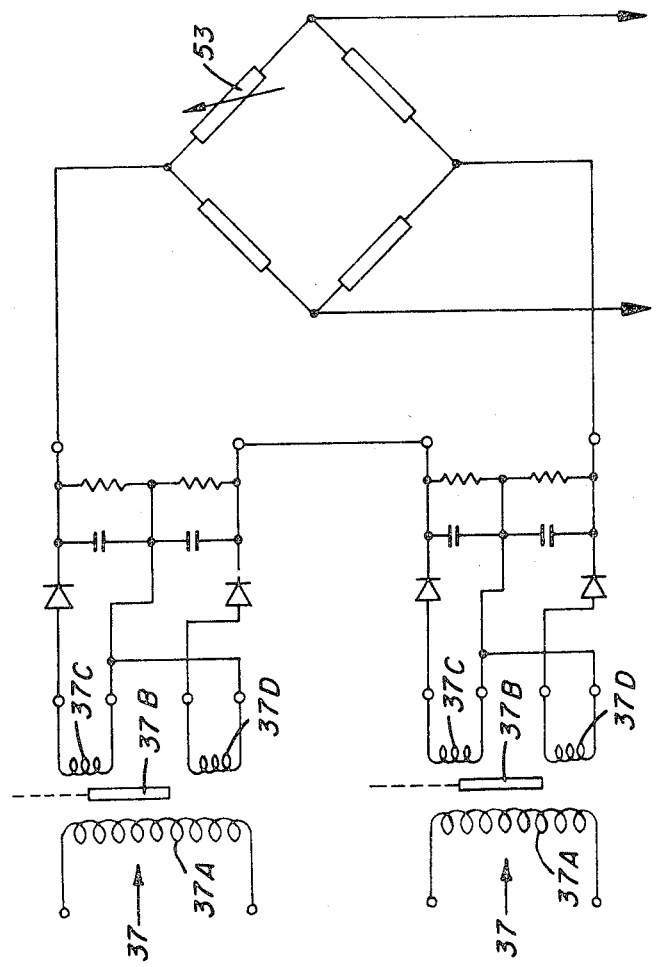
FIG. 5 is a schematic drawing of a load cell shown in FIG. 4.

The cable 5 has one end wound on the drum 19 and extends from the winch drum first over five pulleys 23A to 23E of a rope accumulator 23. In the rope accumulator 23, the pulleys 23A, 23C and 23E are firmly anchored while pulleys 23B and 23D are carried by a movable beam 27 which is biased in the direction indicated by the arrow 25 by a biasing device 29. Although device 29 is indicated as a tension spring connected between the beam 27 and a fixed anchor point, it could take any other suitable form, such as a compression spring or a pneumatic or hydraulic cylinder device. From the rope accumulator the cable 5 passes round guide sheaves 31 and 33 and then round a final sheave 35 before passing upwardly through the deck 3 to the helicopter 1. Final sheave 35 is associated with an arrangement of load cells 37 which provide an electrical indication of the force on the sheave 35 and thus of the tension in the part 5A of the cable 1 which extends upwardly from the deck to the helicopter. As indicated in FIG. 4, sheave 35 is mounted on a shaft 38 and the tension in the cable 5 acting on the sheave 35 serves to distort two steel load rings 39 which support the shaft 38. As shown in FIG. 5, each load cell 37 is in the form of a differential transformer having an excitation winding 37A energized by a suitable a.c. source and embracing a ferromagnetic core 37B. Two secondary windings 37C and 37D are arranged to engage longitudinally spaced parts of the core 37B and are connected in opposition. The voltages induced in these two windings 37C and 37D, and thus their net combined output, will depend upon the positioning of the core 37B relative to the windings, and the construction of the load cell 37 is such that this relative movement takes place in accordance with the stressing of the ring 39 associated with the load cell. The d.c. outputs of the two load cells 37 are connected in series.

Associated with the haul-down winch drum 19 is a tachogenerator 41 the d.c. output from which indicates by its polarity the direction of rotation of the winch drum and by its magnitude the speed of rotation of that drum. Associated with the sheave 31 is a tachogenerator 43 the d.c. output from which indicates by its polarity the direction of rotation of this sheave and by its magnitude the speed of rotation of that sheave.

The two tachogenerators 41 and 43 are connected as shown in bucking arrangement so that, with constant and equal speeds of travel of the cable 5 at the drum 19 and at the sheave 31, the combined output from the two tachogenerators is zero. As shown, the two tachogenerators are connected in a series circuit including a variable resistor 45 and a first operating coil 46 of a hydraulic amplifier 47.

On the ship is provided a control console having a TRAVERSE handle 51 and a HAUL DOWN handle 53. The handle 51 is connected to the slider 55 of a potentiometer 57. The handle 53 operates to vary the magnitude of a resistor in one arm of a bridge circuit to which an input is applied from the load cells 37 through an amplifier 59 serving as a load cell coupler. The output from the bridge circuit is applied to the winding of a potentiometer 61, the slider of which can be set to determine the gain of this part of the equipment, and which slider is connected to one terminal of a single-pole two way switch 63. Switch 63 it utilized to select the mode of operation of the equipment between "HAUL DOWN" and "TRAVERSE." The movable arm of the switch applies either the output from the slider of potentiometer 61, or the output from a "TRAVERSE" bridge circuit including the potentiometer 57, to the input of an amplifier function generator 65, the output of which energizes a second operating coil 67 of the hydraulic amplifier 47.

Figure 3:
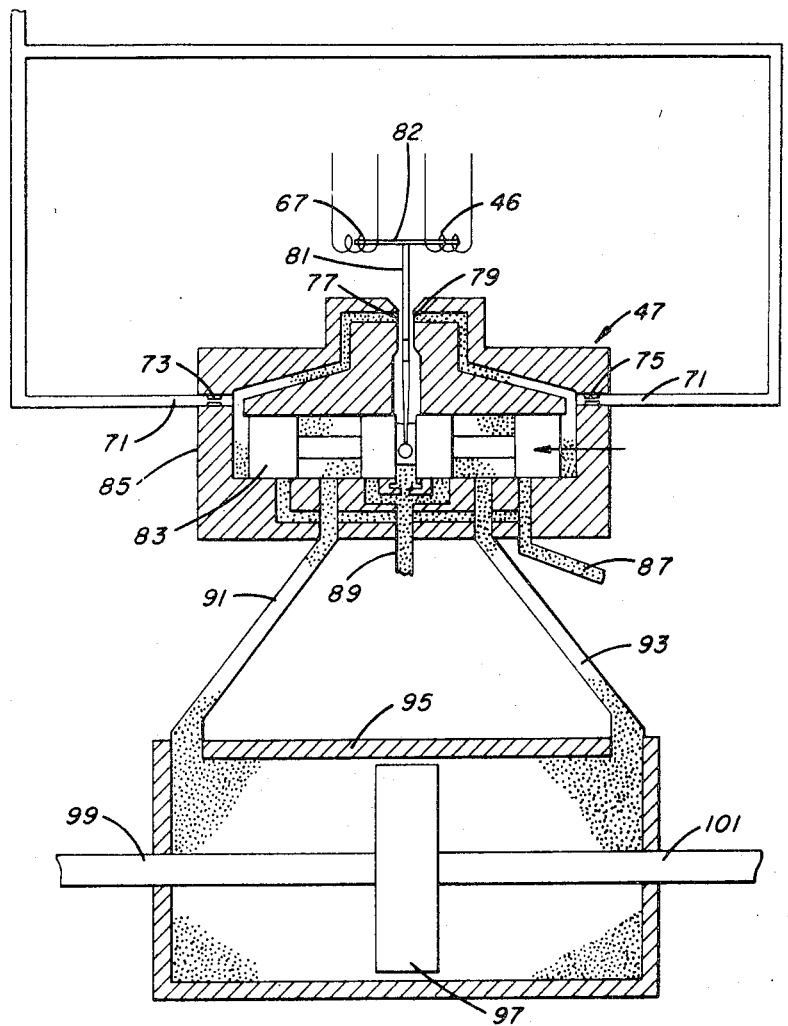
FIG. 3 is a schematic representation of a hydraulic amplifier and servo-valve shown in FIG. 2.

Referring now to FIG. 3, the hydraulic amplifier 47 is fed with hydraulic fluid under pressure through two branches 71 of a supply line, and two separate streams of hydraulic fluid are thus fed respectively through restrictors 73 and 75 to two opposed discharge ports 77 and 79. Between these two ports is disposed a flapper 81 which at one end is connected to an armature 82 subject to the magnetic fields of the two operating coils 46 and 67, and at the other end is connected to the movable spool 83 of a multiport hydraulic spool valve 85. Servo pressure fluid is supplied to this valve 85 through a pipe 87 and can be exhausted from the valve through a pipe 89 back to a reservoir. When the spool valve is in the central position shown, no transfer of servo pressure fluid through the valve takes place to and from two pipes 91 and 93 connected respectively to opposite ends of a hydraulic motor cylinder 95. This motor cylinder 95 contains a piston 97 connected by piston rod 99 to the tilthead mechanism of the variable displacement hydraulic pump 13 and connected by piston rod 101 to the slider of a tilthead position indicating potentiometer 103 (see FIG. 2). As shown, this potentiometer 103 is connected in a traverse bridge network 105 to provide during "TRAVERSE" operation a feed back signal indicative of the actual setting of the pump tilthead and thus of the actual traverse speed (assuming that the speed of driving motor 11 is constant).

Referring now to the operation of the apparatus described, if the ship is riding steadily in a calm sea and the helicopter is tethered by the cable 5 in conditions of no wind and with a constant rotor setting, then the tension in the cable 5 will remain constant so that no change in the length of the part of the cable in the rope accumulator will take place. Under these conditions, there will be zero input to the operating coil 46 of the hydraulic amplifier 47 and the setting of the tilthead of the variable displacement pump 13 will remain constant unless it is changed by a change in the state of energization of the operating coil 67 of the hydraulic amplifier 47. This will occur if the tension in the cable length 5A changes to change the output from the load cells 37, or if the setting of the HAUL DOWN lever of the control console is changed.

For non-ideal sea and wind conditions, the output from the load cells 37 will exercise a primary control over the setting of the flapper 81 of the hydraulic amplifier 47. Lateral movement of this flapper will upset the balance between the pressures in the passages leading to the two opposed ports 77 and 79, and these two pressures being applied to opposite ends of the valve spool 83 will cause that spool to move axially and so cause a flow of hydraulic fluid through pipes 91 and 93 to reset the piston 97 of the motor cylinder 95 and so change the setting of the hydraulic pump tilthead. The movement of the spool 83 effects a compensating movement of the flapper 81 to ensure a correspondence between the setting of the valve spool 83 with the magnitude of the signal applied to the operating coil.

Since the speed of operation of the control system is finite, a sudden relative movement between the helicopter and the ship due to a wind gust or to wave action or to a combination of the two can prove too quick for the winch alone to keep the cable tension constant or even within preset safety limits. When such a condition arises, additional cable will be stored in, or fed out from, the rope accumulator 23. However, the range of action of the rope accumulator is very limited and it is important that the winch takes corrective action as quickly as possible. Whenever a discrepancy occurs between the velocity of the cable length 5A and the velocity of the cable being wound onto or off the drum 19, the arrangement of the two tachogenerators 41 and 43 will provide an additional signal with the correct polarity to the operating coil 46 of the hydraulic amplifier 47 to position the pump tilthead to lessen the tension deviation from the selected tension.

By the action of the apparatus described above, an improved response to the operating conditions met in practice is obtained, which enables the helicopter haul-down apparatus to be used under more adverse conditions than would otherwise be the case.

Although the invention has been described, by way of example, with respect to the hauling down of a helicopter onto a ship, the cable tensioning means clearly can be applied to other situations in which it is desired to maintain a desired tension in a cable. One such use is in the raising and lowering of loads where adverse conditions could cause variations in the tension of the cable; a further use in the maintenance of a suitable tension is a horizontally extending cable used, for example, to support a load supporting traveller.

We claim:

1. Means for maintaining a desired tension in a length of cable comprising:
    a. a cable tensioning winch;
    b. a reversible driving motor for that winch;
    c. winch control means for the driving motor;
    d. tension sensing means arranged to monitor the actual tension in the said length of cable;
    e. tension setting means arranged to provide a signal representative of a desired cable tension;
    f. a cable accumulator arranged to store a bight or loop of the said cable at a point intermediate the winch and the said length of cable;
    g. the accumulator being such that the amount of cable stored in the bight or loop can vary from instant to instant to provide a snatch-absorbing and shock-absorbing facility;
    h. a first device providing an output signal indicative of the actual winch speed;
    i. a second device acting upon a part of the cable between the accumulator and the said length of cable and providing an output signal indicative of the actual velocity of the said length of cable;
    j. control means arranged to receive the outputs from the first device, the second device, the output from the tension sensing means; these control means in accordance with their inputs being effective to control the direction and speed of operation of the driving motor for the winch in a manner producing the desired tension in the said length of cable;
    k. said control means combining the output of the first device and the output of the second device to produce a signal indicative of whether the cable is being paid-out or taken-in by the winch at a faster rate, or at a slower rate, than the cable passing from the cable accumulator to the said length of cable, thus sensing the difference of the speed of said first and second outputs providing an anticipatory control to the winch control means.

2. Tension maintaining means according to claim 1, and in which:
    a. the first device is a tachogenerator;
    b. the second device is a tachogenerator;
    c. each tachogenerator provides a direct current the polarity of which depends upon the direction of rotation of the tachogenerator and the magnitude of which depends upon the speed of rotation of the tachogenerator;
    d. the outputs of the two tachogenerators are applied in opposition to produce a direct current signal the polarity of which indicates which tachogenerator is running the faster and the magnitude of which indicates the difference in speed between the two tachogenerators.

3. Tension maintaining means according to claim 1, and in which:
    a. the control means for the motor are themselves subjected to a primary control;
    b. that primary control is determined by the outputs of the tension sensing and the tension setting means;
    c. that primary control is effective under steady operating conditions to maintain the actual tension substantially equal to the desired tension;
    d. the control means for the motor are themselves subjected to a secondary control;
    e. that secondary control is determined by the outputs of the first device and the second device; and f. that secondary control is effective under rapidly changing operating conditions to provide an anticipatory correction of the winch speed.

4. Tension maintaining means according to claim 3, and in which:
   a. the control means include an electromagnetically-operated hydraulic valve;
   b. that valve has a first operating winding;
   c. a primary control current is applied to the first operating winding to provide the said primary control;
   d. that valve has a second operating winding; and
   e. a secondary control current is applied to the second operating winding to provide the said secondary control.

5. Tension maintaining means according to claim 4, and in which:
   a. the hydraulic valve is a spool valve;
   b. the hydraulic valve includes a flapper valve;
   c. the two operating windings are arranged to control movement of the flapper valve;
   d. the spool valve includes piston surfaces;
   e. the flapper valve selectively applies hydraulic pressure to piston surfaces of the spool valve to reposition the valve spool; and
   f. the valve spool is mechanically linked with the flapper valve in such a manner that the spool is biased to a position which corresponds with the net output of the two windings.

6. Tension maintaining means according to claim 5, and in which:
   a. the control means include a double-ended hydraulic cylinder containing a piston;
   b. the spool of the hydraulic valve is arranged to control the flow of hydraulic fluid to and from the ends of that cylinder;
   c. a variable speed hydraulic motor forms the said reversible driving motor for the winch;
   d. a hydraulic pump is arranged to supply hydraulic fluid to drive the said hydraulic motor;
   e. a constant speed electric motor is arranged to drive the said hydraulic pump;
   f. a tilt-head or swash plate of the hydraulic pump determines by its position the flow and the direction of flow of hydraulic fluid between the pump and the motor; and
   g. the said piston is coupled to and thus by its position controls the position of the tilt-head or swash plate.

7. Tension maintaining means according to claim 1, and in which the tension setting means includes a manual control which can be reset during continuous operation of the winch to change the desired cable tension.

* * * * *